June 15, 1926.

J. H. BURROW 1,588,936

TIRE SHIELD

Filed August 3, 1925

Inventor
James H. Burrow

By Herbert E. Smith
Attorney

Patented June 15, 1926.

1,588,936

UNITED STATES PATENT OFFICE.

JAMES H. BURROW, OF SPOKANE, WASHINGTON.

TIRE SHIELD.

Application filed August 3, 1925. Serial No. 47,737.

My present invention relates to an improved tire shield in the form of a wrapper or bandage for use in connection with the inner tubes of pneumatic tires of the balloon type for automotive vehicle wheels. The shield is designed to hold or retain the pressure of air in tubes of low pressure or balloon tires, strengthen or reinforce the tube in its resistance to road shocks, and prevent relative movement of the shield within the outer casing of the tire. By the location of the shield between the outer casing and inner tube, a puncture of the tire may be closed and the casing reinforced.

The shield is made up of a wound strip of rubberized material having semi-rigid parts as at the outer periphery of the inner tube, and a resilient cushioning pad on the shield in position to frictionally engage the inner surface of the tread portion of the tire casing by means of which the shield may automatically adjust itself in position to prevent relative movement of the shield within the tire casing.

The shield is also fashioned with a thin anchoring portion intermediate its ends which is located at the inner periphery of the inner tube to assist in retaining the shield against displacement between the casing and inner tube.

Figure 1:
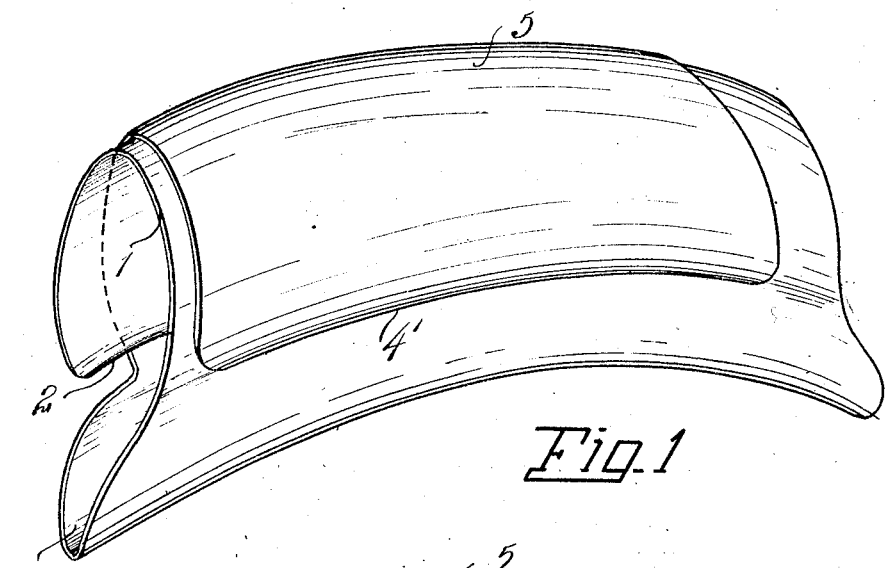
Figure 1 is a perspective view of a tire shield embodying my invention.

In carrying out my invention I utilize a strip of fabric as 3 the length of the shield or strip and build up this fabric strip with layers to form a thickened portion $1^a$ which when the shield is in use lies against the outer periphery of the inner tube to close a puncture therein and strengthen the inner tube at this point. The fabric of the shield is rubberized to give it a semi-rigidity or stiffness and the shield is manufactured in various sizes on suitable mandrels adapted for the purpose in order that they will conform to the shape of the tire. The shields are fashioned in the form shown in Figure 1 for shipment and they may readily be unrolled from this form for application to the tire when needed.

Figure 2:
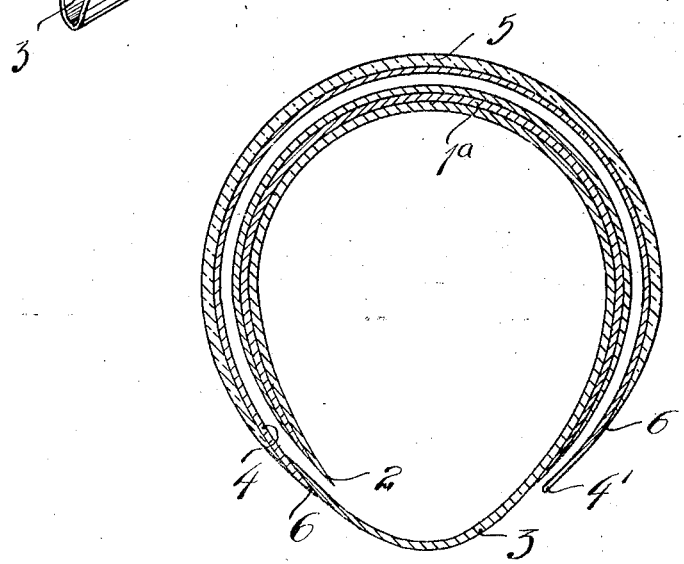
Figure 2 is a transverse sectional view through the shield.

The inner end 2 of the tubular thickened portion of the shield is tapered or beveled to a thin edge as best seen in Figure 2 to lie snug and without wrinkle against the inner portion of the inner tube, and at 3 the single thickness of material is elongated to form an anchoring portion for the shield at the inner periphery of the inner tube.

The outer wrap 4 of the shield which encircles the thickened part $1^a$ is of single thickness and the outer edge or end $4'$ of this wrap is also thinned to present a smooth surface against the inner face of the outer casing.

On the outer wrap 4 of the shield I attach or seal a cushioning pad 5, preferably of rubber with its greatest thickness at the outer periphery of the shield and in position to frictionally engage the inner side of the tread portion of the outer casing. The edges 6 of this attached pad taper at 6 flush with the surface of the strip 4 to present a smooth surface within the outer casing.

This cushioned or padded outside wrap of the shield is of greater flexibility and less rigidity than the laminated or thickened portion $1^a$ of the inner wrap of the shield in order that it may with facility be wrapped around the inner wrap and also in order that it may adjust itself to smooth frictional engagement with the inner face of the outer casing.

The outer wrap thus provides close frictional engagement between the outer face of the thickened portion $1^a$ and adds a layer to the inner wrap $1^a$, and at the same time provides a resilient or flexible cushion or pad between the shield and the outer casing. As the wheel revolves heat is generated within the tire casing sufficient to perform the function of slightly softening the rubber pad 5 whereby the pad is caused to adhere to the inner face of the tread portion of the outer casing.

The inner face of the thin anchoring portion 3 and the inner face of the inner wrap $1^a$ are also caused by friction which creates heat to adhere to the outer face of the inner tube. This adhesion while sufficient to hold the shield in place against dislodgment while the wheel is revolving is not sufficient to prevent unwrapping of the shield from the punctured inner tube or from the outer casing, when the shield is to be removed and the punctures or blow out repaired.

Having thus fully described my invention, what I claim as new and desire to secure by Letters Patent is—

1. A shield comprising an inner wrap having a thickened body and a thin free edge, an anchoring portion of thin material at the inner side of the shield and a thin outer wrap having an outer free edge, and an exterior cushion of resilient material on the outer portion of the outer wrap.

2. A repair shield having a semi-rigid inner wrap to encircle an inner tube and a flexible outer wrap, and a cushioning pad of resilient material attached to the exterior of the outer wrap at the outside of the shield.

In testimony whereof I affix my signature.

JAMES H. BURROW.